United States Patent
Husmann et al.

(10) Patent No.: US 7,374,715 B2
(45) Date of Patent: *May 20, 2008

(54) CO-CURED RESIN TRANSFER MOLDING MANUFACTURING METHOD

(75) Inventors: Christopher H. Husmann, Gardena, CA (US); Chi H. Sheu, Los Angeles, CA (US); Denise M. Shimazu, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 957 days.

This patent is subject to a terminal disclaimer.

(21) Appl. No.: 10/153,301

(22) Filed: May 22, 2002

(65) Prior Publication Data

US 2003/0218267 A1 Nov. 27, 2003

(51) Int. Cl.
*B29C 45/16* (2006.01)

(52) U.S. Cl. ............ 264/510; 264/511; 264/102; 264/257; 264/258

(58) Field of Classification Search ........ 264/510–512, 264/257–258, 102, 324
See application file for complete search history.

(56) References Cited

U.S. PATENT DOCUMENTS

| | | | |
|---|---|---|---|
| 4,062,917 A * | 12/1977 | Hill et al. | 264/102 |
| 4,492,607 A * | 1/1985 | Halcomb | 156/242 |
| 4,644,039 A | 2/1987 | Boyd et al. | |
| 4,654,407 A | 3/1987 | Domeier | |
| 4,681,718 A * | 7/1987 | Oldham | 264/102 |
| 4,927,907 A | 5/1990 | Corley | |
| 4,942,013 A * | 7/1990 | Palmer et al. | 264/511 |
| 4,973,636 A | 11/1990 | Corley | |
| 4,988,469 A * | 1/1991 | Reavely et al. | 264/113 |
| 5,032,451 A | 7/1991 | Corley | |
| 5,190,773 A | 3/1993 | Damon | 425/186 |
| 5,198,515 A | 3/1993 | van Swieten et al. | |
| 5,232,650 A * | 8/1993 | Behan et al. | 264/219 |
| 5,403,537 A | 4/1995 | Seal et al. | 264/511 |
| 5,863,635 A | 1/1999 | Childress | |

(Continued)

FOREIGN PATENT DOCUMENTS

EP 0 722 826 A2 7/1996

(Continued)

OTHER PUBLICATIONS

Brian Butler, "SAE slide Presentation," Attachment "B," 1 page, Sep. 2001.

(Continued)

*Primary Examiner*—Mary Lynn Theisen
(74) *Attorney, Agent, or Firm*—Fulbright & Jaworksi LLP

(57) ABSTRACT

According to one embodiment of the invention, a co-cured resin transfer molding manufacturing method includes providing a tool having one or more tooling details and disposing one or more preforms proximate the one or more tooling details. The one or more preforms are either dry or binderized. The method further includes disposing a high permeability medium outwardly from the one or more tooling details, disposing a prepreg skin panel outwardly from the high permeability medium, disposing the one or more tooling details and the prepreg skin panel within the tool, injecting a resin into the one or more preforms, and curing the one or more preforms and the prepreg skin panel.

35 Claims, 5 Drawing Sheets

U.S. PATENT DOCUMENTS

| | | | |
|---|---|---|---|
| 5,876,540 A | | 3/1999 | Pannell |
| 5,876,832 A | | 3/1999 | Pannell |
| 5,906,782 A | * | 5/1999 | Blanchard et al. .......... 264/255 |
| 5,935,475 A | | 8/1999 | Scoles et al. |
| 5,935,698 A | | 8/1999 | Pannell |
| 5,968,445 A | * | 10/1999 | McCarville et al. ........ 264/571 |
| 5,968,639 A | | 10/1999 | Childress |
| 5,980,665 A | | 11/1999 | Childress |
| 6,136,236 A | * | 10/2000 | Boccard et al. ............ 264/40.1 |
| 6,508,909 B1 | * | 1/2003 | Cerezo Pancorbo et al. ....................... 156/306.6 |
| 6,638,466 B1 | * | 10/2003 | Abbott ....................... 264/238 |
| 2002/0022422 A1 | | 2/2002 | Waldrop et al. ............ 442/179 |
| 2003/0019567 A1 | | 1/2003 | Burpo et al. ................ 156/245 |
| 2003/0051434 A1 | * | 3/2003 | McKague et al. ......... 52/782.1 |

FOREIGN PATENT DOCUMENTS

| | | |
|---|---|---|
| EP | 1149687 A2 | 10/2001 |
| EP | 1 134 070 | 3/2004 |
| GB | 2360483 A | 9/2001 |
| WO | WO 03/045671 A1 | 6/2003 |

OTHER PUBLICATIONS

Brian Butler, "Composites Affordability Initiative (CAI)," Attachment "C," AIAA slide presentation, 1 page, Apr. 3, 2000.

Brian Butler, "Composites Affordability Initiative," Attachment "D," AIAA presentation, AIAA-2000-1379, 5 pages, Apr. 3, 2000.

B. Butler, et al., "The Composites Affordability Initiative, Phase II, Pervasive Technology Overview," Attachment "E," Sample paper, 7 pages, May 2000.

D. Shimazu, et al., "Wing Producibility Demonstration Article Composites Affordability Initiative," Presented at Sampe May '00, 11 pages, Copyright 2000.

European Search Report for EP 03 25 2387, 3 pages, Sep. 1, 2003.

* cited by examiner

CO-CURED RESIN TRANSFER MOLDING MANUFACTURING METHOD

TECHNICAL FIELD OF THE INVENTION

The present invention relates generally to the field of composites construction and, more particularly, to a co-cured resin transfer molding manufacturing method.

BACKGROUND OF THE INVENTION

Composite structures are desirable in many industries for many applications. For example, aircraft, space, and land/sea vehicles employ a variety of curved and multiple-contoured surface structures in their fabrication. Composite materials are commonly used for these structures because, among other desirable attributes, composite materials have high strength-to-weight ratios and allow the design and fabrication of large integrated composite structures. Even so, structures formed from composite materials oftentimes need to be stiffened or joined to adjacent structures. Therefore, manufacturers of composite structures are continually searching for better and more economical ways of stiffening and/or assembling composite structures.

SUMMARY OF THE INVENTION

According to one embodiment of the invention, a co-cured resin transfer molding manufacturing method includes providing a tool having one or more tooling details and disposing one or more preforms proximate the one or more tooling details. The one or more preforms are either dry or binderized. The method further includes disposing a high permeability medium outwardly from the one or more tooling details, disposing a prepreg skin panel outwardly from the high permeability medium, disposing the one or more tooling details and the prepreg skin panel within the tool, injecting a resin into the one or more preforms, and curing the one or more preforms and the prepreg skin panel.

Embodiments of the invention provide a number of technical advantages. Embodiments of the invention may include all, some, or none of these advantages. A composite structure manufactured according to one embodiment of the present invention is cost-efficient because of the substantial reduction or elimination of touch labor allowed by part count and fastener count reduction due to part integration. In addition, superior dimensional control and less weight of stiffened composite structures is achieved. This weight reduction is particularly advantageous in aircraft applications. A manufacturer of composite structures may tailor a skin panel for weight efficiency and high performance via unidirectional prepreg product forms, for example. In some embodiments, no mechanical fasteners or adhesives are needed to attach the substructure to the skin panel, which saves considerable time and money in constructing stiffened composite structures. However, Z-pins film or adhesives may be used to complement the co-curing of the substructure to the skin panel to create crack propagation resistance.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1 through 3E of the drawings, in which like numerals refer to like parts.

Figure 1:
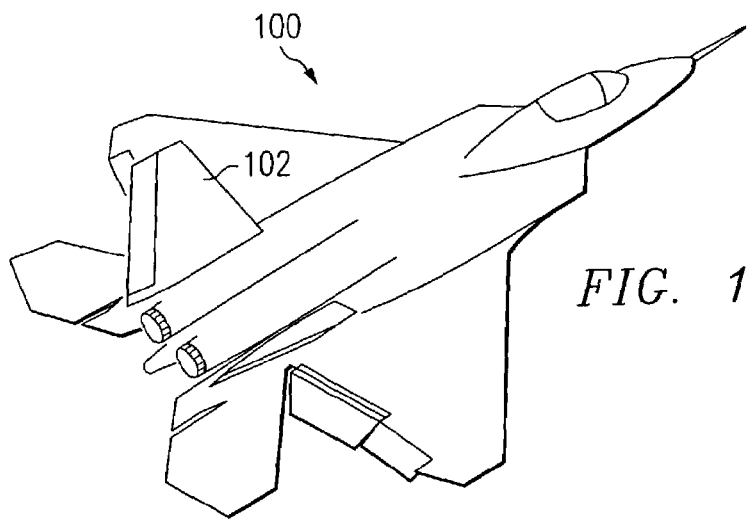
FIG. 1 is a perspective view of an aircraft having a panel formed from a composite structure constructed according to one embodiment of the present invention.

FIG. 1 is a perspective view of an aircraft 100 having a panel 102 formed from a composite structure 200 (FIG. 2) constructed according to one embodiment of the present invention. Aircraft 100 may be any suitable aircraft and panel 102 may be any suitable structural panel on aircraft 100, such as a tail panel, a wing panel, or a fuselage panel. Although aircraft 100 is illustrated in FIG. 1, panel 102 may be employed in any suitable aircraft, space, land/sea vehicle, or other machines, devices, or structures formed by composite materials. The following detailed description uses an aircraft application to illustrate one or more embodiments of composite structure 200 manufactured according to the teachings of the present invention. One embodiment of composite structure 200 is illustrated below in conjunction with FIG. 2.

Figure 2:
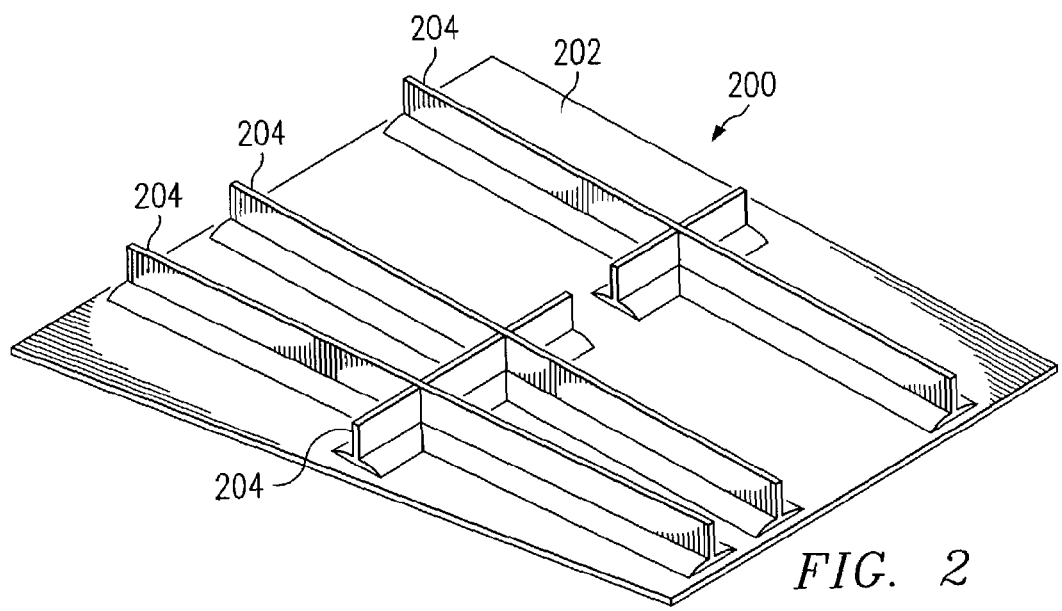
FIG. 2 is a perspective view of the inside of the composite structure of FIG. 1.

FIG. 2 is an inside perspective view of one embodiment of composite structure 200. Composite structure 200 is formed from, in one embodiment, a prepreg skin panel 202 and one or more preforms 204 that are cocured to prepreg skin panel 202 according to the teachings of the present invention as set forth below. Generally, a "prepreg" is a composite material (i.e., fiber that is impregnated with a resin) that is not yet cured, though may be partially staged.

Prepreg skin panel 202 is formed from a composite material having any suitable fibers impregnated with any suitable resin. Accordingly, the fibers in prepreg skin panel 202 may be formed from any suitable 2D and/or 3D material and may be uni-directional, bi-directional, chopped, woven or braided. Any suitable number of layers of fiber may be used to form prepreg skin panel 202. The resin may be any suitable resin, such as epoxy or bismaleimide. Prepreg skin panel 202 may be formed using any suitable composite forming technique, such as a hand laid, tape laid, fiber placed, or woven technique. In the illustrated embodiment, prepreg skin panel 202 forms a portion of an outer skin of aircraft 100. For example, prepreg skin panel 202 may coincide with a portion of the outer skin of a tail section, a wing section, or a fuselage section, as mentioned above. Accordingly, prepreg skin panel 202 may have any suitable shape, dimensions, and thickness. In addition, prepreg skin panel 202 may be substantially flat or may have one or more contours to conform to the shape of a particular portion of aircraft 100 or other suitable vehicle or device.

Preforms 204 function to impart strength and/or stiffness to prepreg skin panel 202 or serve as attachment members.

As such, preforms 204 are typically in the form of structural shapes, such as I-beams, T-beams, hat stiffeners, or other suitable structural shapes. As illustrated in FIG. 2, preforms 204 form a number of ribs and spars for panel 102 of aircraft 100. There may be any number of preforms 204 formed on the surface of prepreg skin panel 202, and preforms 204 may be arranged in any suitable configuration depending on the design parameters for composite structure 200. Preforms 204 are either dry or binderized, and may be any suitable textile preform, such as a fabric preform, a stitched preform, a warp knit preform, a 3D preform, a braided preform, or any combination thereof. The fiber material may be the same as, or different from, the fiber used in prepreg skin panel 202. Binderized preforms are preforms with resin applied to the surface(s) to provide tack and handling stability to the preform. Any suitable binder resin may be utilized that is compatible with design requirements and manufacturing process.

According to the teachings of the present invention, preforms 204 are joined to prepreg skin panel 202 via co-curing of prepreg skin panel 202 with resin-injected preforms 204, as described in detail below in conjunction with FIGS. 3A through 3E. This co-curing forms a unitized/integrated structure that blends the strengths of many different product forms and processes into a cost-efficient, performance-driven composite structure 200. For example, some embodiments of the present invention capitalize on the dimensional precision of resin transfer molding type tooling and the high tailorability, performance, and weight efficiency of prepreg product forms. An important technical advantage of the present invention is that very large structures, such as skin panels for aircraft 100, may be integrated to very large preforms for stiffening and/or attachment purposes.

Figure 3E:
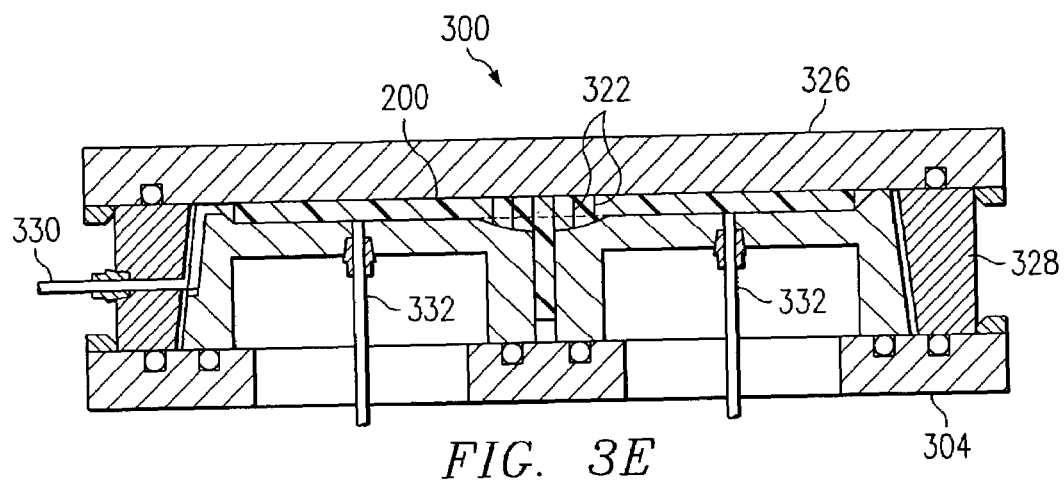
FIG. 3E is cross-sectional view of the composite structure of FIGS. 3A through 3D showing the composite structure within a tool according to one embodiment of the present invention.
Figure 3A:
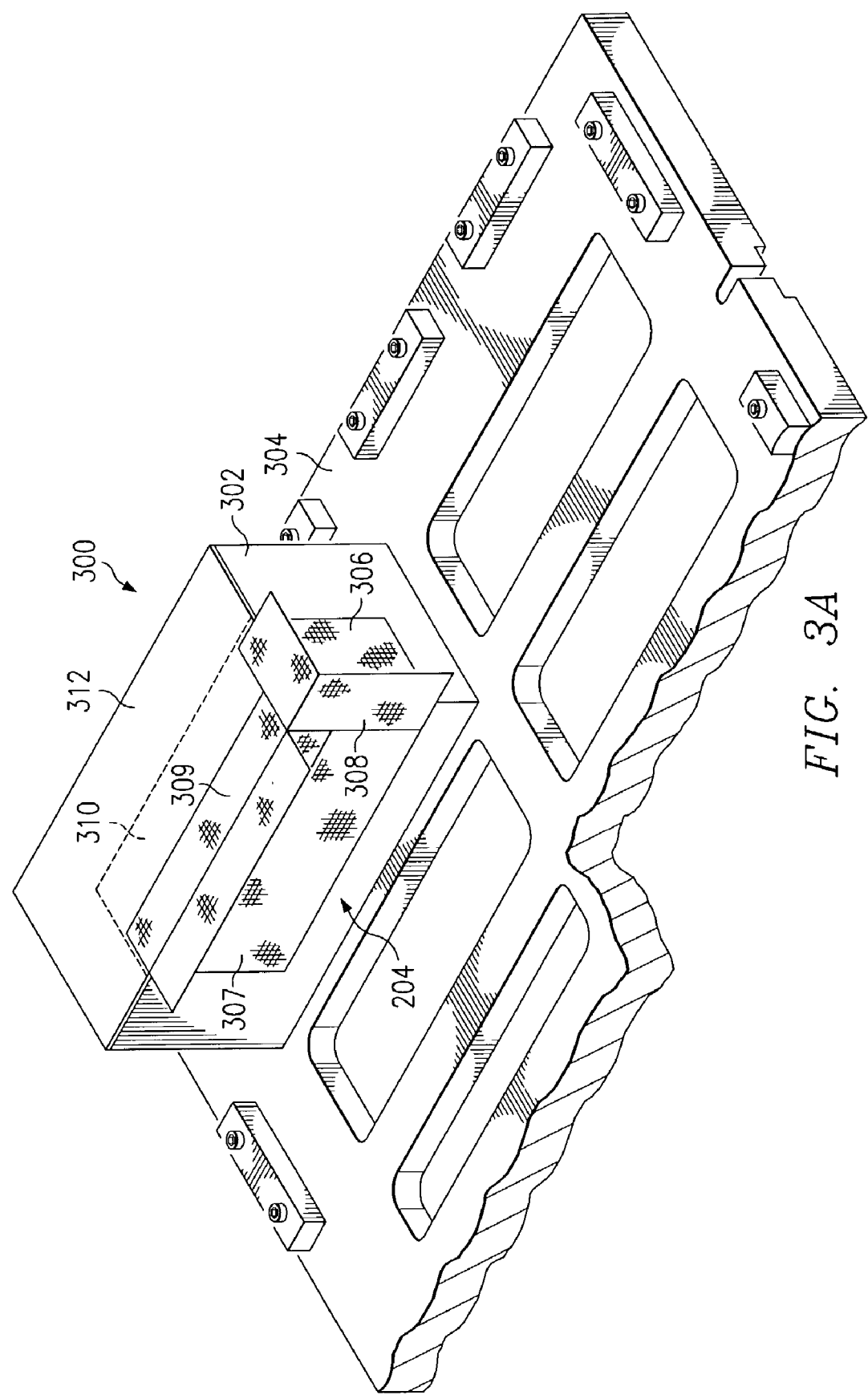
FIGS. 3A through 3D are perspective views illustrating one method of constructing a composite structure according to one embodiment of the present invention.

FIGS. 3A through 3D are perspective views, and FIG. 3E is a cross-sectional view, demonstrating one method of constructing composite structure 200 according to one embodiment of the present invention. The method begins by building up preforms 204 into a predetermined configuration as defined by the design parameters. One predetermined configuration is illustrated by the ribs and spars (denoted by reference numerals 204) in FIG. 2. As illustrated in FIG. 3A, a tool 300 having a base plate 304 and one or more tooling details 302 is provided. A tooling detail as described herein refers to a portion or component of an overall tool that is used as a mold for forming composite structure 200. A first tooling detail 302 is shown in FIG. 3A to be disposed on base plate 304 of tool 300.

Base plate 304, which is formed from any suitable material, may have any suitable configuration depending on the configuration of preforms 204 and prepreg skin panel 202. Tooling detail 302, which is also formed from any suitable material, is used to build up preforms 204 into the predetermined configuration. For example, as shown in FIG. 3A, tooling detail 302 has preform 204 disposed outwardly therefrom. In this example, preform 204 includes web portions 306, 307 and flange portions 308, 309. The material, dimensions and configuration of both web portions 306, 307 and flange portions 308, 309 are determined by the design of composite structure 200. In other words, if skin panel 102 of aircraft 100 requires both ribs and spars, as shown in FIG. 2 by reference numerals 204, then web portion 306 and flange portion 308 may be a portion of one of the ribs and web portion 307 and flange portion 309 may be a portion of one of the spars. The remainder of the ribs and spars are built up using other tooling details 302, as described further below.

To facilitate the flow of resin during the injection of resin into preforms 204, tooling detail 302 also includes a high permeability medium 310, as shown by the hidden lines in FIG. 3A. High permeability medium 310 may be any suitable material, such as a composite screen, that facilitates the flow of resin during a resin transfer molding process. High permeability medium 310 is disposed on an outer surface of tooling detail 302 in a position determined by design parameters of the resin transfer molding process, such as where the resin is injected and the configuration and details of preforms 204.

Also shown in FIG. 3A is a release fabric 312. In one embodiment, release fabric 312 is disposed outwardly from high permeability medium 310. In one embodiment, release fabric 312 is disposed on top of medium 310 as it rests on tooling detail 302. Release fabric 312 may be any suitable release fabric, such as a teflon coated release fabric. Release fabric 312 can be of any size larger than medium 310.

Although not explicitly illustrated in FIG. 3A, a wrap ply may be utilized in some embodiments to facilitate skin panel 202 design intention. If utilized, wrap ply is disposed between preform 204 and tooling detail 302. As another option, a resin film (not shown) may be used on the outer surface of the wrap ply and preform 204 to facilitate the placement of wrap ply and preform 204 onto tooling detail 302 and/or the wrap ply. The resin film is typically a tacky material that allows non-tacky materials to stay in place.

Separate tooling details 302 are used to form separate portions of the overall configuration of preforms 204. Each tooling detail 302 is sequentially disposed on base plate 304 with their respective preforms 204 until all tooling details 302 have been placed. In the example illustrated in FIGS. 3A through 3D, a total of eight tooling details 302 are utilized; however, any suitable number of tooling details may be utilized depending on the configuration of composite structure 200.

Figure 3B:
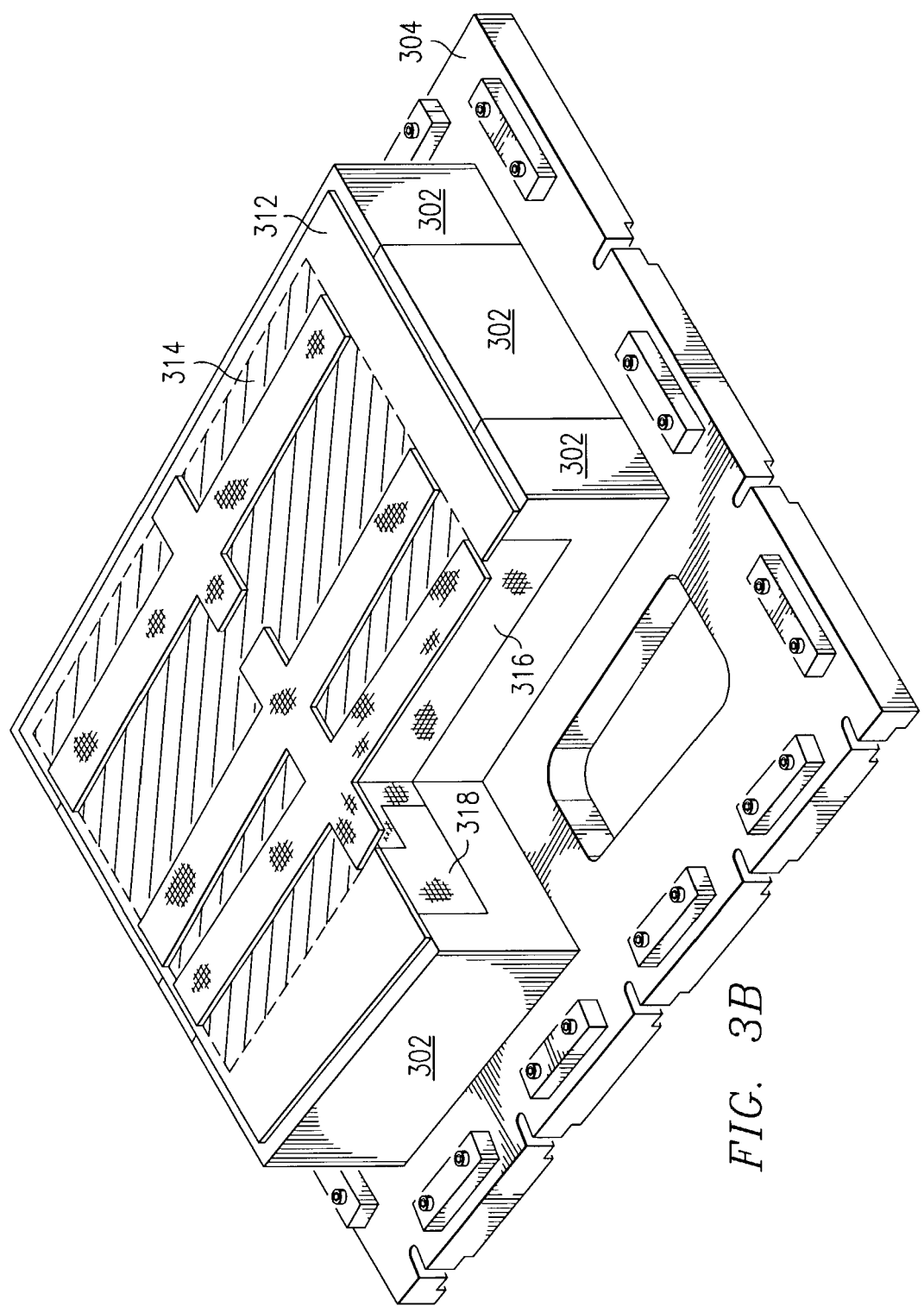

FIG. 3B shows seven of those eight tooling details 302 placed on base plate 304 of tool 300. As illustrated, the general configuration of preforms 204 as outlined in FIG. 2 above may be seen. A shaded area 314 that is illustrated in FIG. 3B is the high permeability medium 310 underneath release fabric 312. Because the final tooling detail 302 has not been placed on base plate 304 yet, one can see a preform denoted by reference numeral 316 that comprises a portion of a spar web, and a preform as denoted by reference numeral 318 that comprises a portion of a rib web. After the final tooling detail 302 is placed on base plate 304, then prepreg skin panel 202 may be disposed over tooling details 302 and release fabric 312. This is illustrated in FIG. 3C.

Figure 3C:
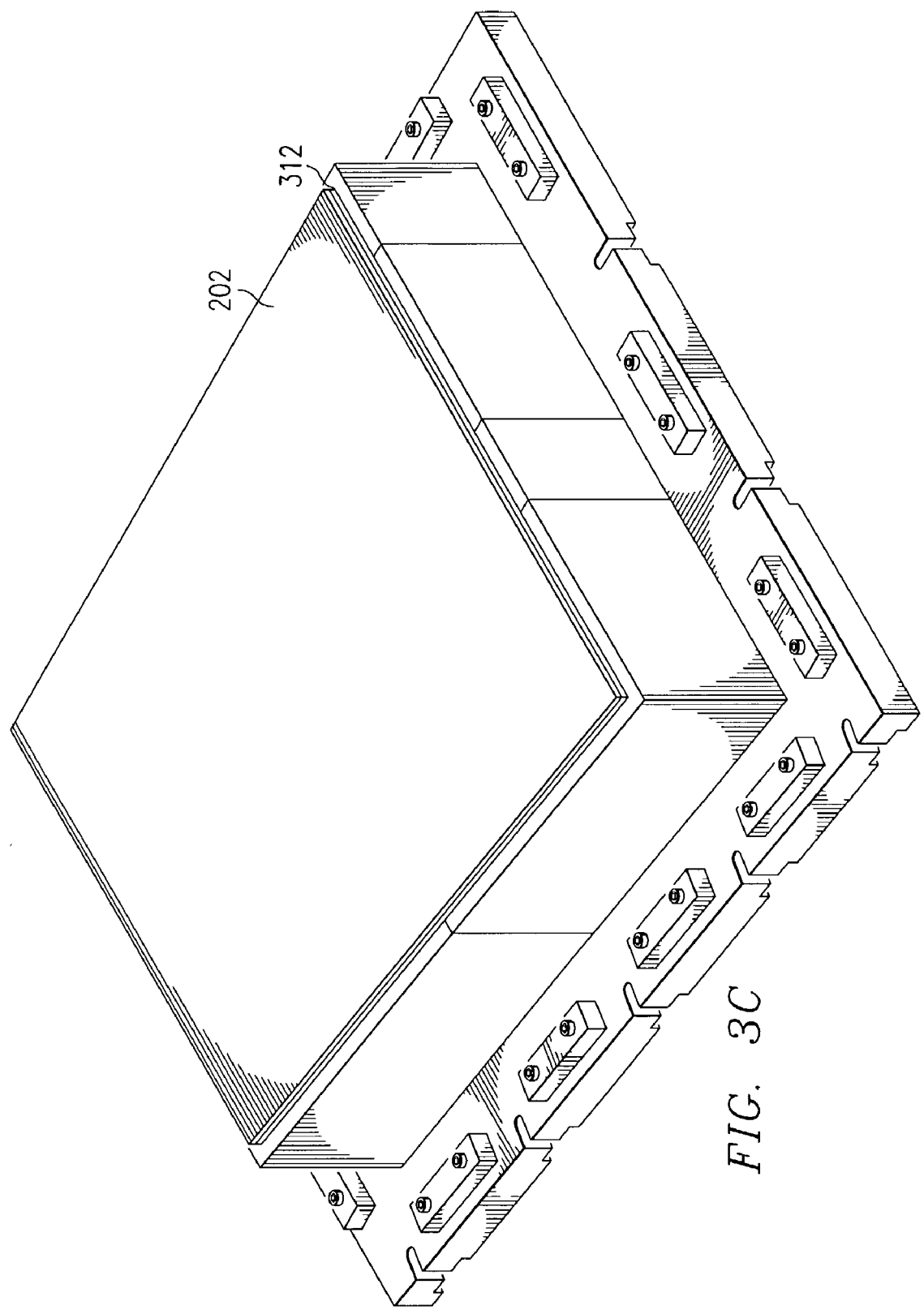

As illustrated in FIG. 3C, prepreg skin panel 202 is disposed outwardly from release fabric 312. Although not explicitly illustrated in FIG. 3C, a plurality of fasteners 322 (FIG. 3E), such as Z-pins, may couple prepreg skin panel 202 to preforms 204 for added strength and/or damage resistance. For example, if a crack starts to develop in composite structure 200 during use, fasteners 322 may inhibit crack propagation. Fasteners 322 may be inserted by any suitable process, such as pushing or driving while being vibrated with ultrasonic energy. Any suitable number of fasteners 322 may be utilized in any suitable configuration. An adhesive film may optionally be disposed between prepreg skin panel 202 and preforms 204. The adhesive film may provide additional bonding between prepreg skin panel 202 and preforms 204. Any suitable adhesive film may be utilized that is compatible with design requirements and manufacturing process.

In some embodiments, before disposing prepreg skin panel 202 outwardly from release fabric 312, prepreg skin panel 202 may be vacuum debulked, which may remove some of the air pockets in prepreg skin panel 202. The vacuum debulking of prepreg skin panel 202 may be performed at room temperature, or an additional vacuum debulk cycle at an elevated temperature for a predetermined time may optionally be utilized. For example, prepreg skin panel 202 may be vacuum debulked at room temperature during lay-up and, after skin collation, debulked at an elevated temperature to improve compaction, such as 250° F.±50° F., for 30-120 minutes. Pressure may also optionally be applied to further compact prepreg skin panel 202 during debulking. Staging may optionally be utilized to modify the cure characteristics or flow of the prepreg resin. After disposing prepreg skin panel 202 onto the tool details, tool 300 is final assembled as illustrated in FIG. 3D.

Figure 3D:
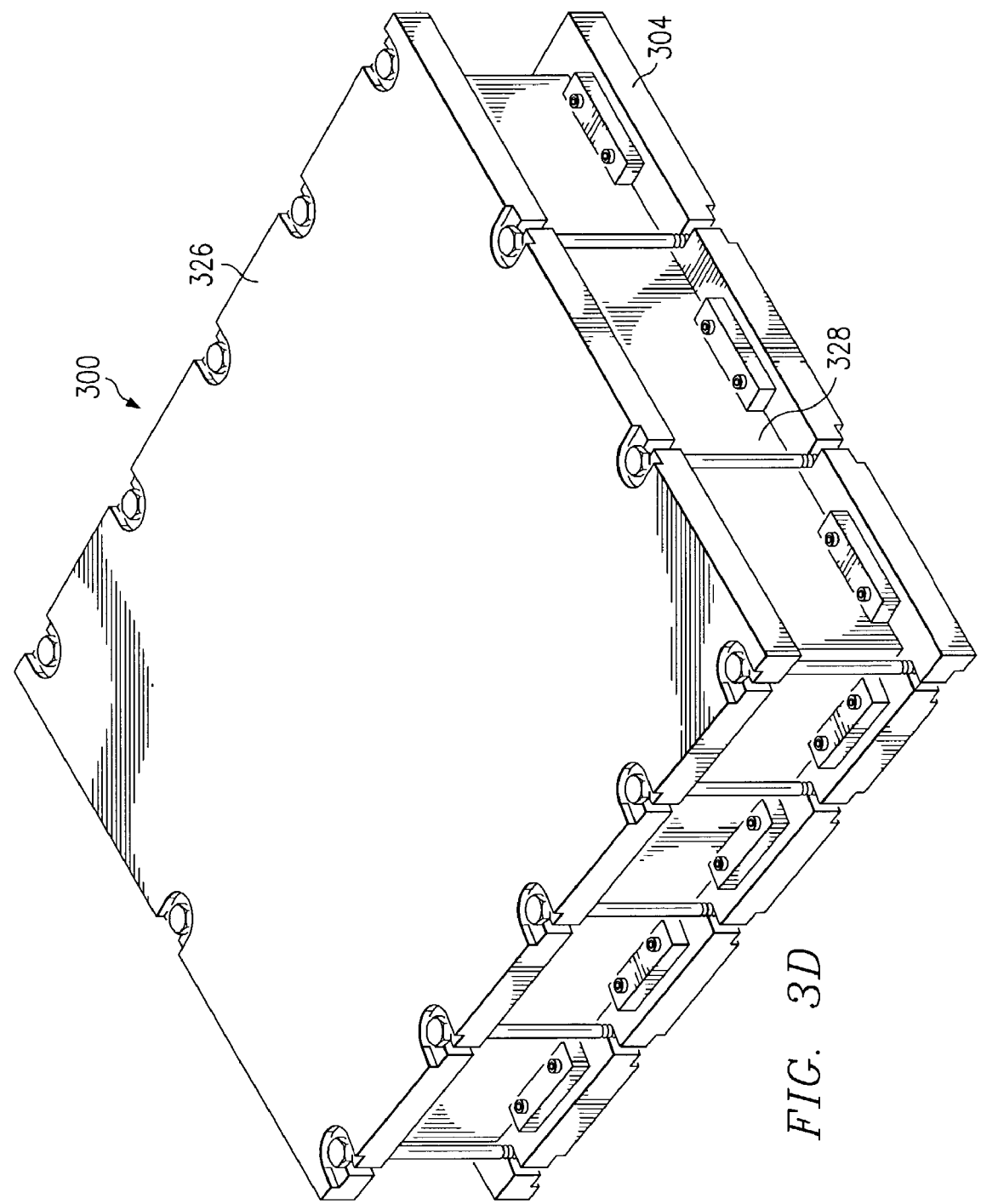

FIG. 3D illustrates tool 300 fully assembled. Tool 300 may have a top plate 326 that is coupled to base plate 304 and a retaining ring 328 coupled between top plate 326 and base plate 304 to complete tool 300. Both top plate 326 and retaining ring 328 may be formed from any suitable material. After tool 300 is completed, it may be placed in a press (not explicitly shown), so that pressure may be applied on tool 300 before the injection of resin. Thereafter, resin may be injected and the co-curing of prepreg skin panel 202 to preforms 204 may be performed.

FIG. 3E is a cross-sectional view of composite structure 200 showing composite structure 200 within tool 300. As illustrated, top plate 326 is coupled to base plate 304 with retaining ring 328 therebetween. An inlet 330 is used to inject the resin, and one or more vents 332 help to remove air in addition to aiding in the witnessing of the resin being injected. One embodiment of the injecting and curing cycle is described as follows. Vacuum is applied to tool 300 and tool 300 is heated to a predetermined temperature, such as 250° Fahrenheit±50° F. Other suitable temperatures may be utilized. The heating of tool 300 may be accomplished in an oven or tool 300 may be a self-heated tool. Concurrently, the resin to be injected is heated in a pressure pot or other suitable container to a predetermined temperature, such as 250° Fahrenheit±50° F. Again, other suitable temperatures may be utilized. In a particular embodiment, the resin is heated to a temperature which is less than the temperature of tool 300. After heating the resin, the resin is vacuum degassed, which prepares the resin for injection.

The degassed resin is pressurized in the pressure pot to a predetermined pressure. For example, a pressure that the resin is pressurized to may be at least 15 psi. Resin is thereafter injected using inlet 330. The injection of the resin is stopped when all vents 332 are witnessed. In other words, once each vent 332 has resin flowing therethrough then that particular vent 332 is closed. This continues until all vents are witnessed. After the injection of the resin, the final curing cycle takes place.

To start the curing cycle, tool 300 is heated from its injection temperature to a higher temperature, such as 300°-400° Fahrenheit. Tool 300 is then held for a predetermined time, such as six hours. This holding period helps cure the prepreg skin panel 202 and newly resin injected preforms 204 and join them together. As an option, a post cure may be performed for a predetermined time period. For example, a post cure may be carried out at 440° F. for approximately six hours for a bismaleimide resin. This curing may take place while composite structure 200 is in tool 300 or composite structure 200 may be removed from tool 300 and placed in any suitable oven. Other suitable temperatures and hold times may be utilized.

Although embodiments of the invention and their advantages are described in detail, a person skilled in the art could make various alterations, additions, and omissions without departing from the spirit and scope of the present invention as defined by the appended claims.

What is claimed is:

1. A co-cured resin transfer molding manufacturing method, comprising:
   providing a tool having one or more tooling details;
   disposing a high permeability medium outwardly from the one or more tooling details:
   disposing one or more preforms proximate the one or more tooling details, the one or more preforms being either dry or binderized;
   disposing a prepreg skin panel outwardly from the high permeability medium;
   disposing the one or more tooling details and the prepreg skin panel within the tool;
   injecting a resin into the one or more preforms; and
   curing the one or more preforms and the prepreg skin panel.

2. The method of claim 1, further comprising removing the high permeability medium after curing the one or more preforms and the prepreg skin panel.

3. The method of claim 1, further comprising coupling the prepreg skin panel and the one or more preforms with a plurality of fasteners.

4. The method of claim 3, wherein coupling the prepreg skin panel and the one or more preforms with the fasteners comprises coupling the prepreg skin panel and the one or more preforms with a plurality of Z-pins.

5. The method of claim 1, further comprising disposing an adhesive between one or more preforms and the prepreg skin panel.

6. The method of claim 1, wherein the one or more preforms are selected from the group consisting of a fabric preform, a stitched preform, a warp knit preform, a 3D preform, and a braided preform.

7. The method of claim 1, further comprising vacuum debulking the prepreg skin panel.

8. The method of claim 7, wherein vacuum debulking the prepreg skin panel comprises vacuum debulking the prepreg skin panel at room temperature for a predetermined time and then vacuum debulking the prepreg skin panel at an elevated temperature for a predetermined time.

9. The method of claim 1, further comprising staging the prepreg skin panel.

10. The method of claim 1, wherein the prepreg skin panel is selected from the group consisting of a hand laid prepreg skin panel, a tape laid prepreg skin panel, a fiber placed prepreg skin panel, and a woven prepreg skin panel.

11. The method of claim 1, wherein disposing the prepreg skin panel comprises disposing a prepreg skin panel formed with a bismaleimide resin.

12. The method of claim 1, wherein injecting the resin into the one or more preforms comprises injecting a bismaleimide resin into the one or more preforms.

13. The method of claim 1, further comprising disposing a release fabric between the high permeability medium and the prepreg skin panel.

14. A co-cured resin transfer molding manufacturing method, comprising:

providing a tool having one or more tooling details;
disposing a high permeability medium outwardly from the one or more tooling details;
disposing one or more preforms proximate the one or more tooling details, the one or more preforms being either dry or binderized;
disposing a prepreg skin panel outwardly from the high permeability medium;
disposing the one or more tooling details and the prepreg skin panel within the tool;
injecting a resin into the one or more preforms, wherein injecting the resin into the one or more preforms comprises: pulling a vacuum on the tools, heating the tool to a first predetermined temperatures, heating the resin to a second predetermined temperature, vacuum degassing the resin, pressurizing the resin to a predetermined pressure, and injecting the resin; and
curing the one or more preforms and the prepreg skin panel.

15. The method of claim 14, wherein the first predetermined temperature is greater than the second predetermined temperature.

16. The method of claim 14, wherein curing the one or more preforms and the prepreg skin panel comprises:
heating the tool to a third temperature that is greater than the first predetermined temperature and the second predetermined temperature; and
holding the tool at approximately the third temperature for a first time period.

17. The method of claim 16, further comprising heating the tool to a fourth temperature that is greater than the third temperature and holding the tool at approximately the fourth temperature for a second time period.

18. A co-cured resin transfer molding manufacturing method, comprising:
providing a prepreg skin panel;
processing the prepreg skin panel, the processing selected from the group consisting of vacuum debulking and staging;
providing a tool having a base plate, a top plate, a containment ring, and one or more tooling details;
disposing a high permeability medium outwardly from the one or more tooling details;
disposing a release fabric outwardly from the high permeability medium;
disposing one or more preforms proximate the one or more tooling details, the one or more preforms being either dry or binderized;
disposing the prepreg skin panel outwardly from the release fabric;
disposing the one or more tooling details proximate the base plate:
disposing the prepreg skin panel proximate the top plate;
disposing the containment ring between the base plate and the top plate;
injecting a resin into the one or more preforms; and
curing the one or more preforms and the prepreg skin panel.

19. The method of claim 18, further comprising coupling the prepreg skin panel and the one or more preforms with a plurality of Z-pins.

20. The method of claim 18, further comprising disposing an adhesive between one or more preforms and the prepreg skin panel.

21. The method of claim 18, wherein the one or more preforms are selected from the group consisting of a fabric preform, a stitched preform, a warp knit preform, a 3D preform, and a braided preform.

22. The method of claim 18, further comprising vacuum debulking the prepreg skin panel at an elevated temperature for a predetermined time.

23. The method of claim 18, wherein the prepreg skin panel is selected from the group consisting of a hand laid prepreg skin panel, a tape laid prepreg skin panel, a fiber placed prepreg skin panel, and a woven prepreg skin panel.

24. The method of claim 18, wherein disposing the prepreg skin panel comprises disposing a prepreg skin panel formed with a bismaleimide resin.

25. The method of claim 18, wherein injecting the resin into the one or more preforms comprises injecting a bismaleimide resin into the one or more preforms.

26. The method of claim 18, wherein injecting the resin into the one or more preforms comprises:
heating the tool to a first predetermined temperature;
heating the resin to a second predetermined temperature, the second predetermined temperature less than the first predetermined temperature;
vacuum degassing the resin;
pulling a vacuum on the tool;
pressurizing the resin to a predetermined pressure; and
injecting the resin.

27. The method of claim 18, post-curing the one or more preforms and the prepreg skin panel at an elevated temperature for a predetermined time period.

28. A co-cured resin transfer molding manufacturing method, comprising:
providing a prepreg skin panel formed with a bismaleimide resin;
vacuum debulking the prepreg skin panel at room temperature;
vacuum debulking the prepreg skin panel at an elevated temperature for a predetermined time period;
providing a tool having a base plate, a top plate, a containment ring, and one or more tooling details;
disposing a high permeability medium outwardly from the one or more tooling details;
disposing a release fabric outwardly from the high permeability medium;
disposing one or more preforms proximate the one or more tooling details, the one or more preforms being either dry or binderized;
disposing the prepreg skin panel outwardly from the release fabric;
disposing the one or more tooling details proximate the base plate;
disposing the prepreg skin panel proximate the top plate;
disposing the containment ring between the base plate and the top plate;
injecting a bismaleimide resin into the one or more preforms; and
curing the one or more preforms and the prepreg skin panel.

29. The method of claim 28, further comprising coupling the prepreg skin panel and the one or more preforms with a plurality of Z-pins.

30. The method of claim 28, further comprising disposing an adhesive between one or more preforms and the prepreg skin panel.

31. The method of claim 28, wherein the one or more preforms are selected from the group consisting of a fabric preform, a stitched preform, a warp knit preform, a 3D preform, and a braided preform.

32. The method of claim 28, wherein the prepreg skin panel is selected from the group consisting of a hand laid prepreg skin panel, a tape laid prepreg skin panel, a fiber placed prepreg skin panel, and a woven prepreg skin panel.

33. The method of claim 28, further comprising loading the tool in a press and applying pressure to the tool before injecting the bismaleimide resin.

34. The method of claim 28, wherein injecting the bismaleimide resin into the one or more preforms comprises:
pulling a vacuum on the tool;
heating the tool to a temperature of approximately 250° F;
heating the resin to a temperature of approximately 250° F;
vacuum degassing the resin;
pressurizing the resin to a pressure of at least 15 psi; and
injecting the bismaleimide resin.

35. The method of claim 28, post-curing the one or more preforms and the prepreg skin panel at a temperature of approximately 440° F. for a time period of approximately six hours.

* * * * *